United States Patent [19]
Melotti

[11] Patent Number: 5,390,973
[45] Date of Patent: Feb. 21, 1995

[54] SIDE WINDOW SUN VISOR ASSEMBLY

[75] Inventor: Angelo R. Melotti, Troy, Mich.

[73] Assignee: United Technologies Automotive, Inc., Dearborn, Mich.

[21] Appl. No.: 100,757

[22] Filed: Aug. 2, 1993

[51] Int. Cl.[6] .................................................. B60J 3/02
[52] U.S. Cl. .................................. 296/97.5; 296/97.9; 296/152
[58] Field of Search .................... 296/97.5, 97.9, 97.12, 296/97.13, 152, 214; 160/DIG. 3

[56] References Cited

U.S. PATENT DOCUMENTS

| | | |
|---|---|---|
| 1,898,276 | 2/1933 | Van Dresser . |
| 1,932,475 | 10/1933 | Peteler . |
| 1,941,032 | 12/1933 | Knowles . |
| 2,107,247 | 2/1938 | Johnson . |
| 2,120,892 | 6/1938 | Francis . |
| 2,201,197 | 5/1940 | Minor, Jr. . |
| 2,261,881 | 11/1941 | Horstmann . |
| 2,414,340 | 1/1947 | Spraragen . |
| 2,492,074 | 12/1949 | Thompson . |
| 2,517,872 | 8/1950 | Hamel . |
| 2,596,873 | 5/1952 | Solmes . |
| 2,628,008 | 2/1953 | Innis . |
| 2,634,161 | 4/1953 | Beets . |
| 2,667,222 | 1/1954 | McCarthy et al. . |
| 2,695,193 | 11/1954 | Hamel . |
| 2,823,950 | 2/1958 | Harris . |
| 2,829,920 | 4/1958 | Cohen . |
| 2,831,725 | 4/1958 | Chester . |
| 2,869,922 | 1/1959 | Chester . |
| 2,921,813 | 1/1960 | Lowry . |
| 2,932,539 | 4/1960 | Galbraith . |
| 2,948,566 | 8/1960 | Massey . |
| 2,965,415 | 12/1960 | Dryden . |
| 2,978,274 | 4/1961 | Ordman . |
| 2,999,718 | 9/1961 | Handler . |
| 3,016,262 | 1/1962 | Hunt . |
| 3,032,371 | 5/1962 | Berridge et al. . |
| 3,191,986 | 6/1965 | Simon . |
| 3,328,071 | 6/1967 | Johnson . |
| 3,369,837 | 2/1968 | Metier . |
| 3,403,937 | 10/1968 | Quaine . |
| 3,499,679 | 3/1970 | Olander . |
| 3,556,585 | 1/1971 | Binder . |
| 3,617,088 | 11/1971 | Graham . |
| 3,649,068 | 3/1972 | Moynihan . |
| 3,865,428 | 2/1975 | Chester . |
| 4,169,552 | 10/1979 | Lichtenstein et al. . |
| 4,272,118 | 6/1981 | Viertel et al. . |
| 4,323,275 | 4/1982 | Lutz . |
| 4,468,062 | 8/1984 | Marcus et al. . |
| 4,521,047 | 6/1985 | Saxman . |
| 4,640,543 | 2/1987 | Bradley ........................ 296/152 |
| 4,681,363 | 7/1987 | Hemmeke et al. . |
| 4,762,359 | 8/1988 | Boerema et al. . |
| 4,783,111 | 11/1988 | Hemmeke et al. . |
| 4,792,177 | 12/1988 | Svensson ..................... 296/97.5 X |
| 4,902,068 | 2/1990 | Dowd et al. . |
| 4,913,484 | 4/1990 | Dowd et al. . |
| 4,921,300 | 5/1990 | Lawasanni et al. . |

FOREIGN PATENT DOCUMENTS

| | | |
|---|---|---|
| 36659 | 9/1926 | Denmark . |
| 1340981 | 9/1962 | France . |
| 1396360 | 1/1964 | France . |
| 2497157 | 12/1980 | France . |
| 639882 | 11/1960 | Italy . |
| 58-63517 | 4/1983 | Japan . |
| 1208983 | 10/1970 | United Kingdom ............... 296/97.5 |

Primary Examiner—Joseph Pape
Attorney, Agent, or Firm—Harness, Dickey & Pierce

[57] ABSTRACT

A sun visor is pivotally coupled to a pair of pivot control devices which are mounted above an automobile's side windows. The pivot control devices are located on either horizontal end of a component such as an assist handle assembly and the sun visor can be pivotally moved around this component. Each of the pivot control devices are comprised of a base, a leaf spring and an aesthetic cap such that the leaf spring can apply compressive force against each of a pair of pivot arms extending from the sun visor blade. This provides for detent actions coinciding with the stowed position of the sun visor against the headliner's inside surface and a functional position when the sun visor is rotated downward, parallel to the window.

19 Claims, 4 Drawing Sheets

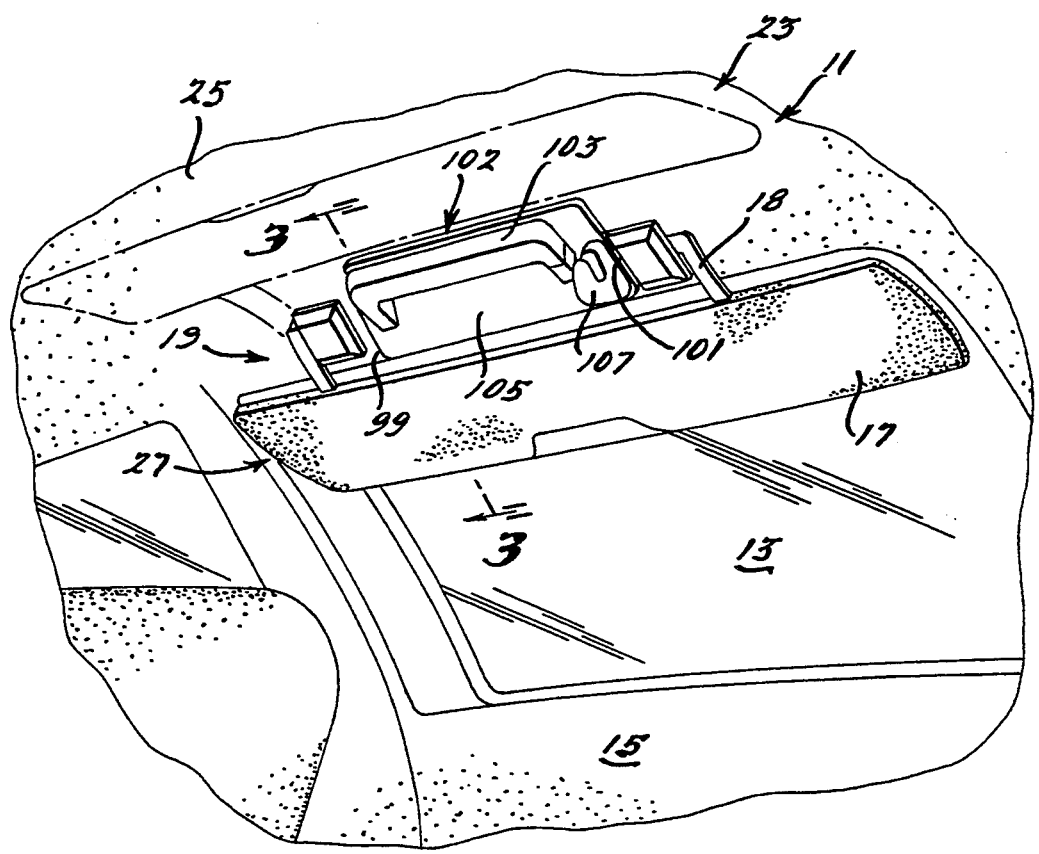
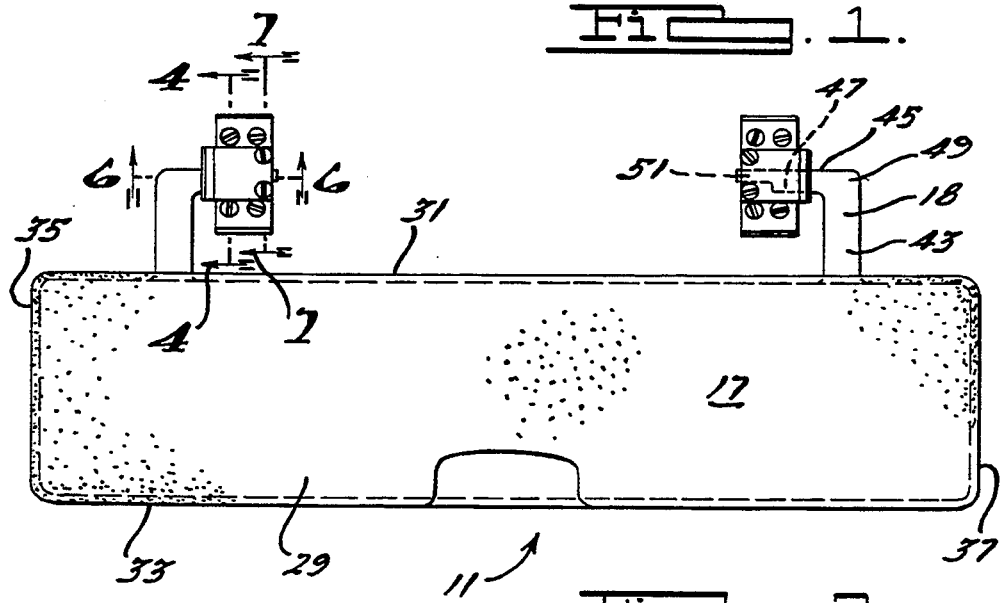

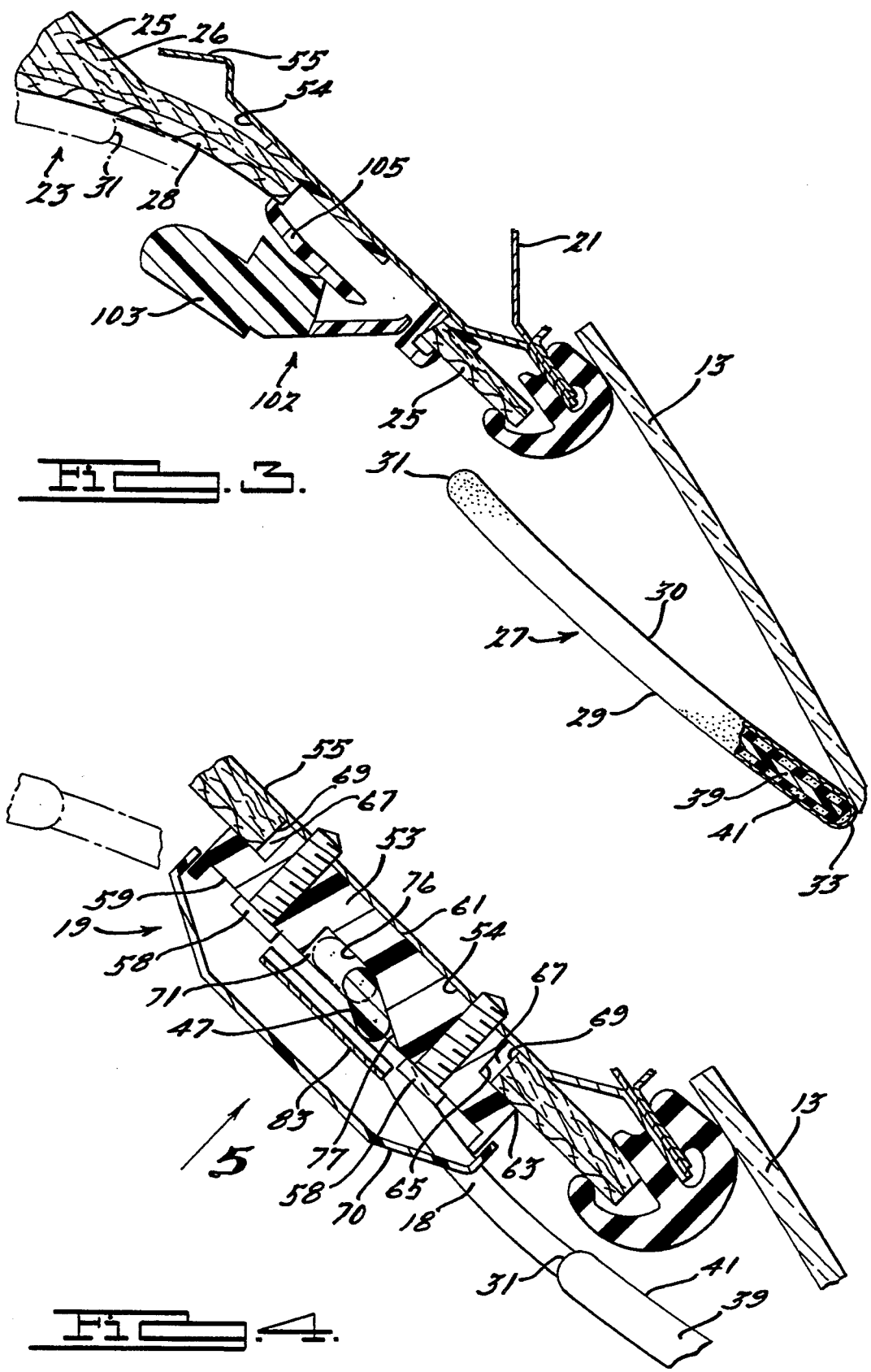

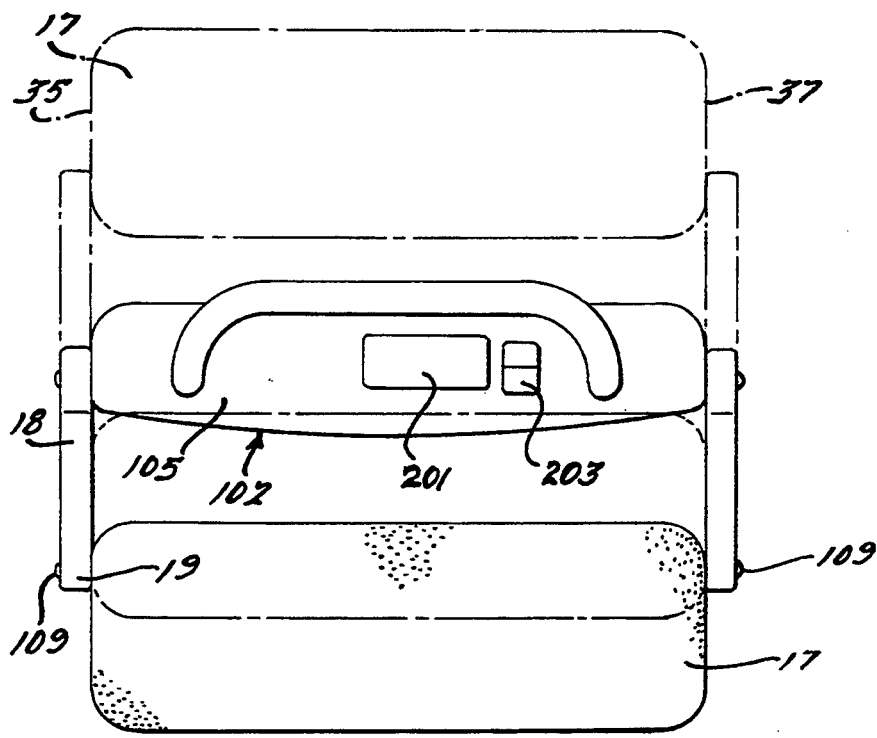
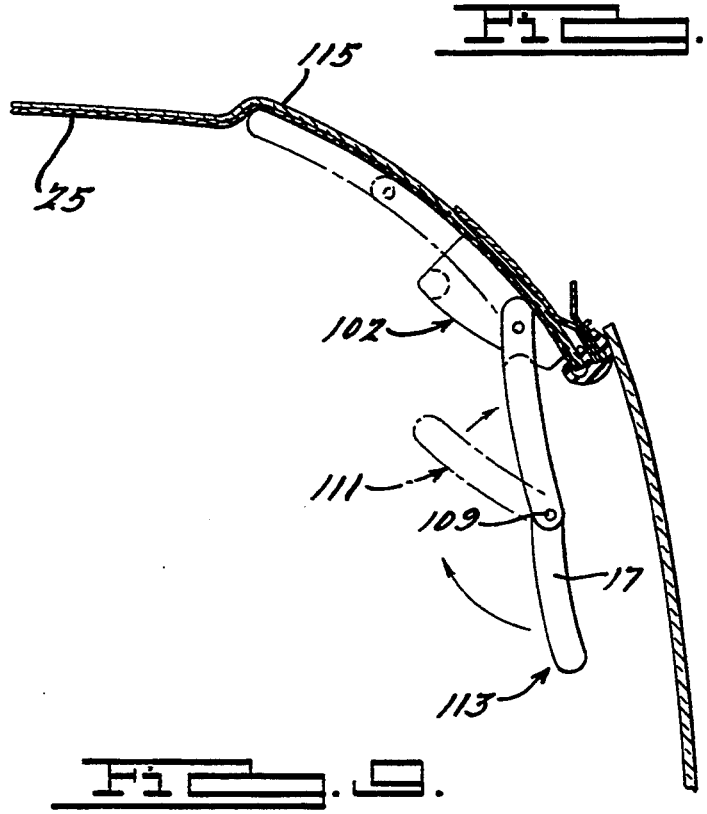

SIDE WINDOW SUN VISOR ASSEMBLY

BACKGROUND OF THE INVENTION

This invention relates generally to sun visor assemblies for automotive vehicles and specifically to side window sun visor assemblies which must pivot around a component, such as an assist handle or lamp, mounted to the vehicle's side rail.

Increasingly, automotive vehicles are being designed with larger window surfaces due to recent styling trends. Although the occupant's visibility is enhanced, the amount of direct sunlight which can enter the front and side windows has been increased and may distract or annoy the occupant. Conventionally, a primary sun visor is rotated downward and then to the side to block sunlight from entering the side windows. Another method that has been used consists of a primary sun visor and an auxiliary sun visor wherein the primary sun visor can be swung downward and to the side window while an auxiliary sun visor can be rotated downward; this system simultaneously blocks sunlight from entering the front and side windows. This method has been described in U.S. Pat. No.: 4,690,450 entitled "Visor System," issued to Boerema, et al. on Sep. 1, 1987; U.S. Pat. No. 2,823,950 entitled "Auxiliary Visor," issued to Harris on Feb. 18, 1958; and, U.S. Pat. No. 2,634,161 entitled "Sun Visor," issued to Beets on Apr. 7, 1953; all of which are incorporated by reference herewithin. However, with the preceding approaches the rear door windows cannot be covered and when these sun visors are stored against the vehicle's roof trim, they obtrusively protrude downward and tend to encroach upon the occupant's head space.

One way around these problems has been to use a pull out sun visor mounted above the side windows. One such design is disclosed in U.S. Pat. No. 4,468,062 entitled "Side Window Visor," issued to Marcus, et al. on Aug. 28, 1984. This design, however, can be difficult to package if an assist handle or coat hook is coincindently located along the side rail of the vehicle.

SUMMARY OF THE INVENTION

In accordance with the present invention, the preferred embodiment of a sun visor assembly used in an automotive vehicle is pivotally coupled to a pair of pivot control devices which are mounted adjacent to a functional component such that the sun visor can pivotally move around this component. This system is ideally suited for use along the vehicle's side windows. Each of the pivot control devices are comprised of a base, a leaf spring and an aesthetic cap such that the leaf spring can apply compressive force against each of a pair of pivot arms extending from the sun visor. This provides for a detent action coinciding with the stowed position of the sun visor against the headliner's inside surface and a functional position when the sun visor is rotated downward, parallel to the window. In an alternate embodiment, the pivot control devices are integrated directly into the side rail component, such as an assist handle assembly or lamp.

Additional advantages and features of the present invention will become apparent from the following description and appended claims, taken in conjunction with the accompanying drawings.

BRIEF DESCRIPTION OF THE DRAWINGS

FIG. 1 is a perspective view showing the preferred embodiment of the present invention sun visor assembly as viewed from the rear of the automobile;

FIG. 2 is a side elevation view of the present invention sun visor assembly from FIG. 1;

FIG. 3 is a vertical cross sectional view of the present invention sun visor assembly, taken from FIG. 1 along line 3—3;

FIG. 4 is a vertical cross sectional view showing the pivot control device of the present invention sun visor assembly, taken from FIG. 2 along line 4—4;

FIG. 8 is a side elevation view showing an alternate embodiment of the present invention sun visor assembly; and FIG. 9 is an elevation view, partially in section, showing the alternate embodiment of the present invention sun visor assembly from FIG. 8.

DETAILED DESCRIPTION OF THE PREFERRED EMBODIMENT

Figure 5:
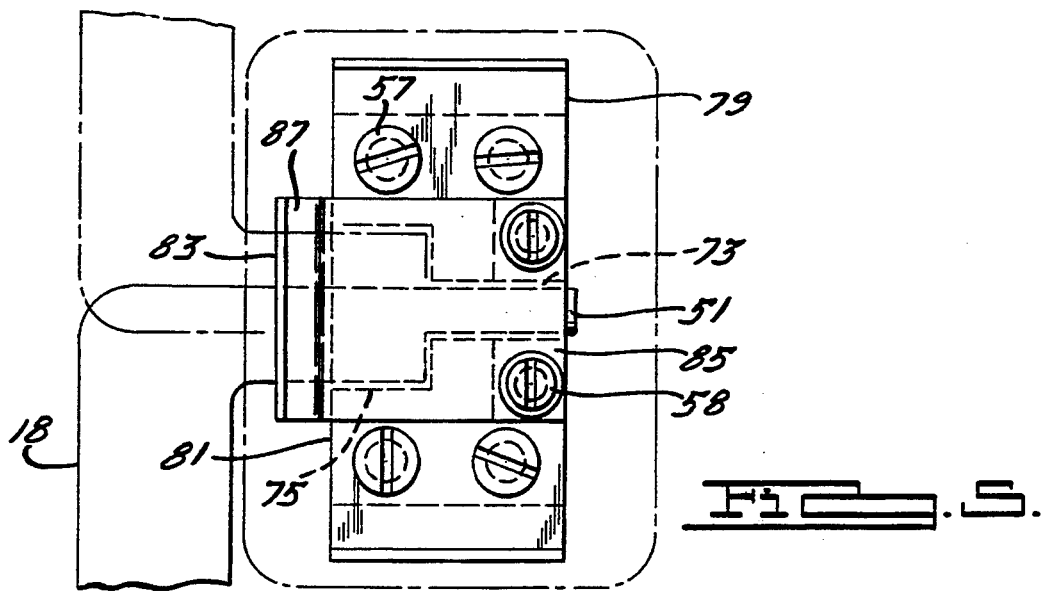
FIG. 5 is a side elevation view showing the pivot control device of the present invention sun visor assembly, taken from FIG. 4 in the direction of arrow 5.

Referring to FIGS. 1-3, a preferred embodiment of the sun visor assembly 11 of the present invention is shown in its installed position above a side window 13 of an automobile's rear door 15. Sun visor assembly 11 comprises a sun visor blade 17, a pair of pivot arms 18 and a pair of pivot control devices 19. Sun visor blade 17 can be placed in a stowed position 23 against a headliner 25 which aesthetically covers the roof 21 of the vehicle. Headliner 25 is comprised of a compression molded substrate 26 which is preferably covered by a foam-back cloth material 28. Sun visor blade 17 can also be pivoted to a functional lower position 27 which is adjacent and parallel to side window 13. Each pivot control device 19 is horizontally separated by a functional component therebetween.

As can be observed in FIGS. 2-4, sun visor blade 17 has an elongated rectangular shape with a thin cross sectional profile. As viewed in its functional lower position 27, sun visor blade 17 has a pair of substantially flat surfaces, 29 and 30, bordered by an upper elongated edge 31 and a lower elongated edge 33 joined by fore and aft edges, respectively 35 and 37. Sun visor blade 17 is constructed from a rigid substrate material 39, such as an injection molded polymeric material, and then covered with a foam backed cloth material 41. A pair of inverted L-shaped pivot arms 18 each have a long extended leg 43 which is rigidly attached to top elongated edge 31 of sun visor blade 17. Each pivot arm 18 also has a shorter inwardly facing leg 45 which contains a caromed portion 47, proximate to an elbow 49, and a cylindrically shaped portion 51 extending inward therefrom. Each short leg 45 acts cooperatively with pivot control devices 19 to frictionally control the rotation of sun visor blade 17.

Figure 6:
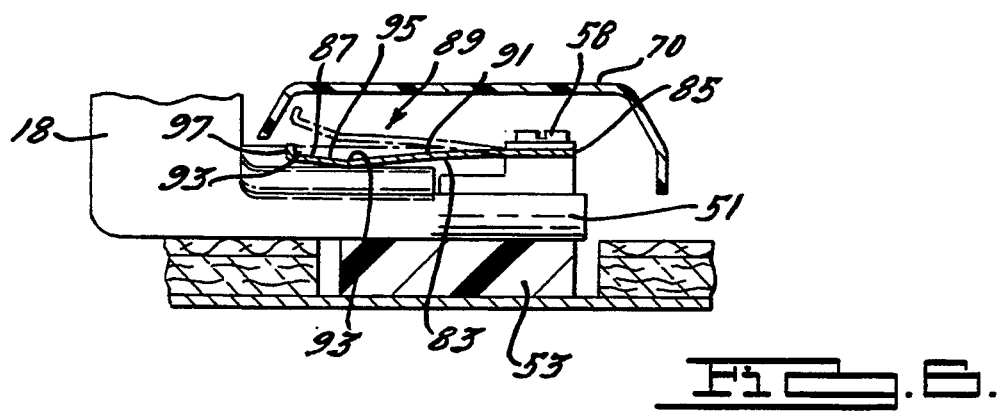
FIG. 6 is a horizontal sectional view showing the pivot control device of the present invention sun visor assembly, taken from FIG. 2 along line 6—6.
Figure 7:
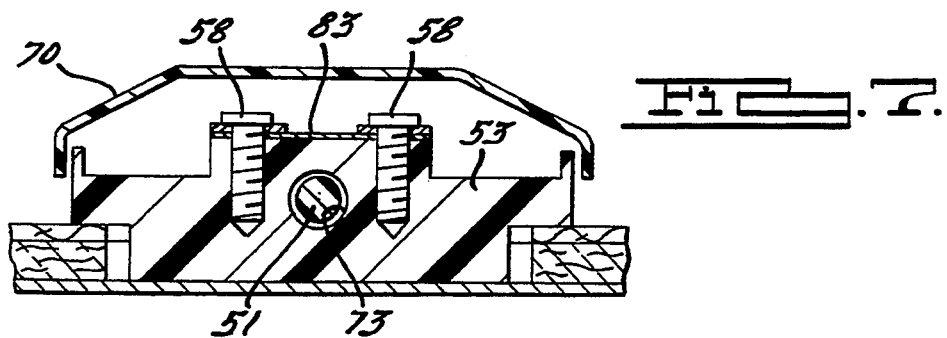
FIG. 7 is a vertical sectional view showing the pivot control device of the present invention sun visor assembly, taken from FIG. 2 along line 7—7.

Referring to FIGS. 4-7, each pivot control device 19 has an irregular cube-shaped base 53 having an inside surface 59 and an outside surface 61. Outside surface 61 is attached to an inside surface 54 of an inner structural member, such as a side rail sheet metal panel 55 which, in turn, is attached to the vehicle's roof 21. The attachment of base 53 to side rail 55 can be accomplished through use of four screws 57 or by using a quick connect fastening means as is known in the art. Furthermore, inside surface 59 and outside surface 61 of base 53 are peripherally connected by side walls having an inner stepped portion 65 and an outer stepped portion 63. Inner stepped portion 65 fits within an opening 67 cut within headliner 25 and outer stepped portion 63 covers a raw edge 69 of headliner 25 at opening 67. Inside surface 59 is aesthetically covered by a plastic cap 70.

A channel 71 is formed horizontally across inside surface 59 of base 53. This channel 71 is comprised of a narrow portion 73 and a wide portion 75. Narrow portion 73 has a semi-cylindrical cross sectional shape for cooperatively maintaining the axial positioning of cylindrical portion 51 of pivot arm 18. Wide portion 75 of channel 71 is comprised of a generally rectangular cross sectional depression 76 with a ramped surface 77 extending along one side therefrom. Narrow portion 73 is closest to a first edge 79 of base 53 and the wide portion 75 is located closest to a second edge 81 of base 53. Camreed surface 47 of pivot arm 21 is located within wide channel 75 and is compressibly trapped therein by a leaf spring 83. Leaf spring 83 has an affixed end 85 which is mounted to a portion of base 53 closest to first edge 79 by a pair of screws 58. Leaf spring 83 also has a free end 87 which applies compressive force upon cammeal surface 47 of pivot arm 18. In the leaf spring's 83 unloaded free position 89, the portion between affixed end 85 and free end 87 has a gentle outside curve 91. Free end 87 has a pair of inside curves 93 separated by a flat portion 95; free end 87 terminates in a return flange 97. When cammed surface 47 of pivot arm 18 is rotated from stowed position 23 toward functional lower position 27, or vice versa, flat 95 of free end 87 applies compressive force thereupon until a detent position has been reached. Such detent positions can be seen in FIG. 4. Leaf spring 83 is preferably made from spring steel, SAE 1095 RC 42-46, 0.41 mm thick (27 gauge).

In the preferred embodiment, each pivot control device 19 bounds a leading edge 99 and rearward edge 101 of an assist handle assembly 102. This can best be seen in FIGS. 1 and 2. Assist handle assembly 102 is comprised of an assist handle 103, a bezel 105 and a coat hook 107. Therefore, when sun visor blade 17 is pivoted from its stowed position 23 to its functional lower position 27, pivot arms 18 are designed to allow clearance of the top elongated edge 31 of sun visor blade 17 in relation to assist handle assembly 102.

An alternative embodiment of the present invention is shown in FIGS. 8 and 9. In this embodiment pivot control devices 19 are integrated directly into bezel 105 of assist handle assembly 102. Bezel 105 includes an interior lamp 201 and an on/off switch 203 electrically connected thereto. Furthermore, within this embodiment, there is a pivotal coupling 109 between each pivot arm 18 and sun visor blade 17. Pivotal couplings 109 are attached to the fore edge 35 and the aft edge 37 of sun visor blade 17 such that sun visor blade 17 can swing from an upward rotated window position 111 to a downward rotated window position 113 independent from the rotational movement of pivot arm 18. This embodiment allows for extended blocking of the sun further down side window 13. Moreover, sun visor blade 17 may be stowed in a depression 115 formed within headliner 25. The relative pivotal movement of sun visor blade 17 to each pivot arm 18 of the alternate embodiment shown in FIGS. 8 and 9 can also be employed in combination with the sun visor assembly 11 (FIGS. 1 and 2) of the preferred embodiment.

While a number of specific embodiments of this sun visor system have been disclosed, it will be appreciated that various modifications may be made without departing from the present invention. For example, the sun visor system of the present invention has been disclosed as being preferably mounted along the side rail of an automobile, however, such a system could also be mounted along the rear of the vehicle. Furthermore, while an assist handle assembly has been described as being a functional component around which the sun visor must pivotally move, an interior lamp or merely a coat hook may also act as such a functional component. While various materials have been disclosed in an exemplary fashion, various other materials may of course be employed. For example, the sun visor blade can be made from pressboard. It is intended by the following claims to cover these and any other departures from these disclosed embodiments which fall within the true spirit of this invention.

The invention claimed is:

1. In combination, a sun visor assembly and an automotive vehicle, said sun visor assembly partially blocking sunlight from entering a vehicle side window, said combination comprising:

an inner structural member being located above said side window of said vehicle and being attached to a roof panel, said inner structural member having an inside surface formed thereupon;

a headliner panel having a substrate and a cover material bonded therebelow, said headliner panel being proximately below said inside surface of said inner structural member;

a side rail functional component being juxtapositioned against said headliner panel and being affixed to said inner structural member;

means for controlling pivotal movement of a pair of pivot arms being located against said headliner panel adjacent to said functional component, said pivot control means being affixed to said inner structural member, said pivot control means further having said pair of pivot arms being rotationally affixed thereto, said pivot arms being rotational in a vertical plane normal to said headliner panel;

a sun visor blade being substantially rigid and having an elongated rectangular shape with a thin cross sectional profile, said sun visor blade having said pair of pivot arms attached thereto;

whereby said sun visor blade can be pivotally moved from a stowed position against said headliner panel to a functional lower position adjacent and parallel to said window, said sun visor blade being pivotally moved vertically around said functional component.

2. The sun visor of claim 1 wherein: each of said pair of pivot arms is L-shaped with a long extended leg being attached to an elongated edge of said sun visor blade and a shorter inwardly facing leg which contains a cammed surface and a cylindrically-shaped portion thereupon being rotationally attached to each of said pair of pivot control means.

3. The sun visor of claim 2 wherein said pivot control means comprises:
   a base having an irregular cubical shape, said irregular cubical shape having an outside and an inside surface, said outside surface being adjacent to said inside surface of said inner structural member, said inside surface of said base having a channel formed horizontally thereacross for receiving said short leg of each of said pair of pivot arms;
   a leaf spring having one end affixed to said inside surface of said base and a free end extending over a portion of said channel formed across said inside surface of said base;
   a cap being mounted upon said base wherein said cap aesthetically hides said leaf spring thereunder; and
   said free end of said leaf spring providing compressive frictional control upon said camming surface when said sun visor blade is pivotally moved from its stowed position to its functional lower position and back again.

4. The sun visor of claim 3 wherein: said leaf spring has a generally rectangular shape, said affixed end being generally flat with a gentle outside curve extending longitudinally therefrom toward said free end, said free end having a pair of tight inside curves thereupon separated by a small flat therebetween, said free end terminating in a return flange.

5. The sun visor of claim 1 wherein: a pair of said pivot control means are located adjacent to said functional component, each of said pair of pivot control means being proximate to each horizontal end of said functional component.

6. The sun visor of claim 5 wherein: said functional component is an assist handle assembly.

7. The sun visor of claim 5 wherein: said functional component is an interior lamp assembly.

8. The sun visor of claim 1 wherein: said sun visor blade is comprised of a generally rigid substrate with cloth covering thereupon.

9. The sun visor of claim 1 wherein: said pair of pivot arms are rotatably connected to at least one edge of said sun visor blade through a pivot coupling whereby said sun visor blade can be rotationally moved independent from said pair of pivot arms.

10. In combination, a sun visor assembly and an automotive vehicle, said sun visor assembly partially blocking sunlight from entering a vehicle rear window, said combination comprising:
    an inner structural member being located above said rear window of said vehicle and being attached to a roof panel, said inner structural member having an inside surface formed thereupon;
    a headliner panel having a substrate and a cover material bonded therebelow, said headliner panel being proximately below said inside surface of said inner structural member;
    a rear functional component being juxtapositioned against said headliner panel and being affixed to said inner structural member;
    means for controlling pivotal movement of a pair of pivot arms being located against said headliner panel adjacent to said functional component, said pivot control means being affixed to said inner structural member, said pivot control means further having said pair of pivot arms being rotationally affixed thereto, said pivot arms being rotational in a vertical plane normal to said headliner panel;
    a sun visor blade being substantially rigid and having an elongated rectangular shape with a thin cross sectional profile, said sun visor blade having said pair of pivot arms attached thereto;
    whereby said sun visor blade can be pivotally moved from a stowed position against said headliner panel to a functional lower position adjacent and parallel to said window, said sun visor blade being pivotally moved vertically around said functional component.

11. The sun visor of claim 10 wherein: each of said pair of pivot arms is L-shaped with a long extended leg being attached to an elongated edge of said sun visor blade and a shorter inwardly facing leg which contains a cammed surface and a cylindrically-shaped portion thereupon being rotationally attached to each of said pair of pivot control means.

12. The sun visor of claim 11 wherein said pivot control means comprises:
    a base having an irregular cubical shape, said irregular cubical shape having an outside and an inside surface, said outside surface being adjacent to said inside surface of said inner structural member, said inside surface of said base having a channel formed horizontally thereacross for receiving said short leg of each of said pair of pivot arms;
    a leaf spring having one end affixed to said inside surface of said base and a free end extending over a portion of said channel formed across said inside surface of said base;
    a cap being mounted upon said base, wherein said cap aesthetically hides said leaf spring thereunder; and
    said free end of said leaf spring providing compressive frictional control upon said camming surface when said sun visor blade is pivotally moved from its stowed position to its functional lower position and back again.

13. The sun visor of claim 12 wherein: said leaf spring has a generally rectangular shape, said affixed end being generally flat with a gentle outside curve extending longitudinally therefrom toward said free end, said free end having a pair of tight inside curves thereupon separated by a small flat therebetween, said free end terminating in a return flange.

14. The sun visor of claim 10 wherein: a pair of said pivot control means are located adjacent to said functional component, each of said pair of pivot control means being proximate to each horizontal end of said functional component.

15. The sun visor of claim 14 wherein: said functional component is an interior lamp assembly.

16. The sun visor of claim 10 Wherein: said sun visor blade is comprised of a generally rigid substrate with cloth covering thereupon.

17. The sun visor of claim 10 wherein: said pair of pivot arms are rotatably connected to at least one edge of said sun visor blade through a pivot coupling whereby said sun visor blade can be rotationally moved independent from said pair of pivot arms.

18. A sun visor assembly employed within an automotive vehicle having an inner structural member disposed above a window located rearwardly of a windshield, said sun visor assembly comprising:
    a functional component affixed to said inner structural member;
    a pair of pivot arms located adjacent to said functional component and pivotably coupled to said inner structural member;

a sun visor blade having an elongated shape with a relatively thin cross sectional profile, said sun visor blade having said pair of pivot arms attached thereto; and said sun visor blade being pivotable from a stowed position to a functional position substantially proximate with said window, said sun visor blade being pivotable about said functional component.

19. A sun visor assembly for an automotive vehicle, said sun visor assembly comprising:

an interior lamp assembly;

at least one pivot arm pivotably journalled to said interior lamp assembly;

a sun visor blade coupled to said at least one pivot arm; and said sun visor blade being pivotably movable from a stowed position to a sunlight blocking position, said sun visor blade being pivotably movable about said interior lamp assembly.

* * * * *